(12) United States Patent
Carney et al.

(10) Patent No.: US 8,072,630 B2
(45) Date of Patent: Dec. 6, 2011

(54) INTEGRATION OF JOB CONTROL AND SYNCHRONIZATION WITH PRINTER CONTROLLER DATA EXCHANGES

(75) Inventors: Dennis M. Carney, Louisville, CO (US); Allan A. Hren, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 963 days.

(21) Appl. No.: 11/382,531

(22) Filed: May 10, 2006

(65) Prior Publication Data

US 2007/0263245 A1 Nov. 15, 2007

(51) Int. Cl.
*G06F 3/12* (2006.01)
(52) U.S. Cl. ...................................... 358/1.15
(58) Field of Classification Search .................. 358/1.15
See application file for complete search history.

(56) References Cited

U.S. PATENT DOCUMENTS

| | | | |
|---|---|---|---|
| 4,992,958 A * | 2/1991 | Kageyama et al. | 358/1.17 |
| 6,266,150 B1 | 7/2001 | Brossman et al. | |
| 6,498,611 B1 | 12/2002 | Beard et al. | |
| 7,304,753 B1 * | 12/2007 | Richter et al. | 358/1.15 |
| 2002/0075505 A1 * | 6/2002 | Murray | 358/1.15 |
| 2003/0117665 A1 * | 6/2003 | Eguchi et al. | 358/402 |
| 2005/0162696 A1 * | 7/2005 | Helms et al. | 358/1.18 |

OTHER PUBLICATIONS

Daniel Barrett; *A Framework for Event Based Software Integration*; ACM Transactions on Software Engineering and Methodology; vol. 5, No. 4; Oct. 1996; pp. 378-421.
Steven Reiss; *The Desert Environment*, ACM Transactions on Software Engineering and Methodology; vol. 8, No. 4; Oct. 1999; pp. 297-342.
Stephan Herrmann, et al.; *PIROL: A Case Study for Multidimensional Separation of Concerns in Software Engineering Environments*; OOPSAL '00 Proceedings; Oct. 2000.

* cited by examiner

*Primary Examiner* — Twyler Haskins
*Assistant Examiner* — Christopher D Wait
(74) *Attorney, Agent, or Firm* — Duft Bornsen & Fishman, LLP (57) ABSTRACT

Methods and systems for synchronization and control of multiple processes in a printer controller using headers associated with data and exchanged among the processes of the printer controller. A first feature hereof provides a method for job control and synchronization among a plurality of processes operable in a printer controller. The method includes associating a job control header with all print data exchanged between the plurality of processes of the printer controller. The method then includes synchronizing operation of the plurality of processes in accordance with information in the job control header. The headers may be exchanged in conjunction with print data moving through the multiple processes and may be generated and exchanged for synchronization and control independent of any print data. Synchronization events may include beginning and/or end of processing for a job, a page, a document, a page description language, etc.

16 Claims, 7 Drawing Sheets

INTEGRATION OF JOB CONTROL AND SYNCHRONIZATION WITH PRINTER CONTROLLER DATA EXCHANGES

BACKGROUND OF THE INVENTION

1. Field of the Invention

The invention relates to the field of printer control and in particular, to methods and systems for integrating job control and synchronization of printer controller processes with exchanges over the data paths between the various printer controller processes.

2. Statement of the Problem

Present day printing systems typically include a local printer controller that performs a number of functions within the printing system. In particular, a printer controller typically includes features for interaction with attached host systems wherein application programs generate data forwarded to the printer to be presented on appropriate print media (e.g., cut sheet or continuous feed paper). Another function of the print controller is to process any such received data to generate corresponding page images representing the received data on the printed media. Typically, such host generated data includes textual information and/or rasterized image information to be presented to a user on the printable media. The printer controller is therefore principally responsible for receiving data encoded in raw form and for converting the received raw data into rendered or rasterized printed pages. The rendered image information is then passed from the print controller to a marking engine to mark appropriate pixels on the printable media to represent the received raw print data on the printed page.

Typical print controllers therefore include a number of distinct processes operable on one or more processors of the printer controller. For example, a first process may be responsible for interacting with the host systems to receive the print data generated by host system applications. One or more other processes may then be responsible for rasterizing or rendering page images from the received, encoded print data. Still other processes may be responsible for transferring the rasterized or rendered page images to the marking engine for eventual presentation on the printable media. Still other processes may be responsible for interaction with the print operator to manage overall operation of the printing system as it relates to the eventual presentation of rasterized print jobs.

Each of these processes plays some role in the processing of received print jobs from attached host systems. A print job may therefore move between a number of different processes and may exist in a number of different states as processing continues through each of the multiple processes. For example, a raw print job generated by a host system may be received from a host system by a first process within the printer controller and may be stored or spooled in that raw form. The spooled print job may then be forwarded to an appropriate translator or rasterizer for the particular language or encoding of the received print job. Alternatively, the received print job may be sent directly from the receiving process to a translator or rasterizer appropriate for the particular print job encoding.

One or more appropriate rasterizers may be involved in processing a particular print job when the print job incorporates multiple languages or encodings. For example, a single print job may include PCL encoded information as well as Postscript encoded information. Therefore, portions of the print data receives from a host system may be directed to a first translator while other portions may be directed to other translators among the plurality of processes within the printer controller.

Still further, the output generated by such translators or rasterizers is generally page images to then be further formatted into appropriate positions on one or both sides of sheets of the printable media. Still other processes within the printer controller handle such formatting processing to place the rasterized page images into appropriate positions on one or more sides of the printable media. Still other processes within the printer controller may handle certain advanced print languages such as IBM's Intelligent Presentation Data System ("IPDS"). An IPDS translator may receive the raw print data and more fully control operation of the printing system during all phases of processing of the received IPDS data.

Clearly coordination and synchronization of such multiple processes operable within a printer controller is an ongoing problem for printer controller designs. It is desirable that the various processes are allowed to proceed largely independent of one another through queue structures used to couple the various processes so that each process may proceed at its optimum speed regardless of the speed of processing of other processes within the printer controller. Simultaneously, it is important to maintain a level of control and synchronization among such a plurality of substantially independent processes to assure that all print data is processed in an orderly manner and that print jobs are eventually printed in a logical, controlled order.

Further, a printer operator or administrative user may wish to alter the normal sequencing of such print job processing and thus may need to impose still further synchronization and control operations among the various processes within the printer controller based on such user interactions.

To achieve such synchronization and control, all processes within the printer controller may be designed to operate in complete lockstep such that a single print job is processed at any given time from beginning to end. In such a lockstep design a print operator or administrative user would have little capability to redefine the synchronization or control of the printing operation to achieve the desired goal for the printing enterprise. Further, since various processes may operate at different speeds, the computational capabilities of the printer controller may be underutilized in that all print job processing would be performed at the speed of the slowest processing process of the multiple processes within the printer controller. Computational processing power within the printer controller may therefore go underutilized in such a lockstep design.

Other known techniques to aid in synchronization and control while allowing substantial concurrent processing among the plurality of processes provide for complex messaging systems. In such complex messaging systems, the various processes exchange synchronization and control information outside of the normal print data processing data communication paths of the various multiple processes of the printer controller. Such an additional, independent, communication path among the various processes of the printer controller generates significant complexity and hence associated costs in the architecture of the printer controller. Further, since the synchronization and control related messaging communication is separate and independent from the data paths associated with the processing of print data, synchronization for certain types of events relating to the print data per se is still further complicated. For example, identifying the beginning or end of a particular document, a particular job, or a particular page description language to be processed may be overly complicated when the synchronization and control communications are totally separate and distinct from the print data processing data paths of the various processes.

It is evident from the above discussion that a need exists to simplify and improve processing of synchronization and control information within a printer controller to permit flexible synchronization and control of print jobs while still allowing significant concurrent processing of multiple such print jobs within a printer controller to thereby better utilize available computational power of the printer controller.

SUMMARY OF THE SOLUTION

The invention solves the above and other related problems with methods and associated systems and apparatus operable to provide synchronization and control of multiple processes in a printer controller using headers associated with data and exchanged among the processes of the printer controller.

A first feature hereof provides a method for job control and synchronization among a plurality of processes operable in a printer controller. The method includes associating a job control header with all print data exchanged between the plurality of processes of the printer controller. The method then includes synchronizing operation of the plurality of processes in accordance with information in the job control header.

Another feature hereof provides a method operable in a printer controller. The method includes exchanging synchronization and control information among a plurality of processes operable within the printer controller. The method also includes synchronizing operation of the plurality of processes in accordance with the exchanged synchronization and control information.

The invention may include other exemplary embodiments described below.

DESCRIPTION OF THE DRAWINGS

The same reference number represents the same element on all drawings.

DETAILED DESCRIPTION OF THE INVENTION

FIGS. 1-8 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
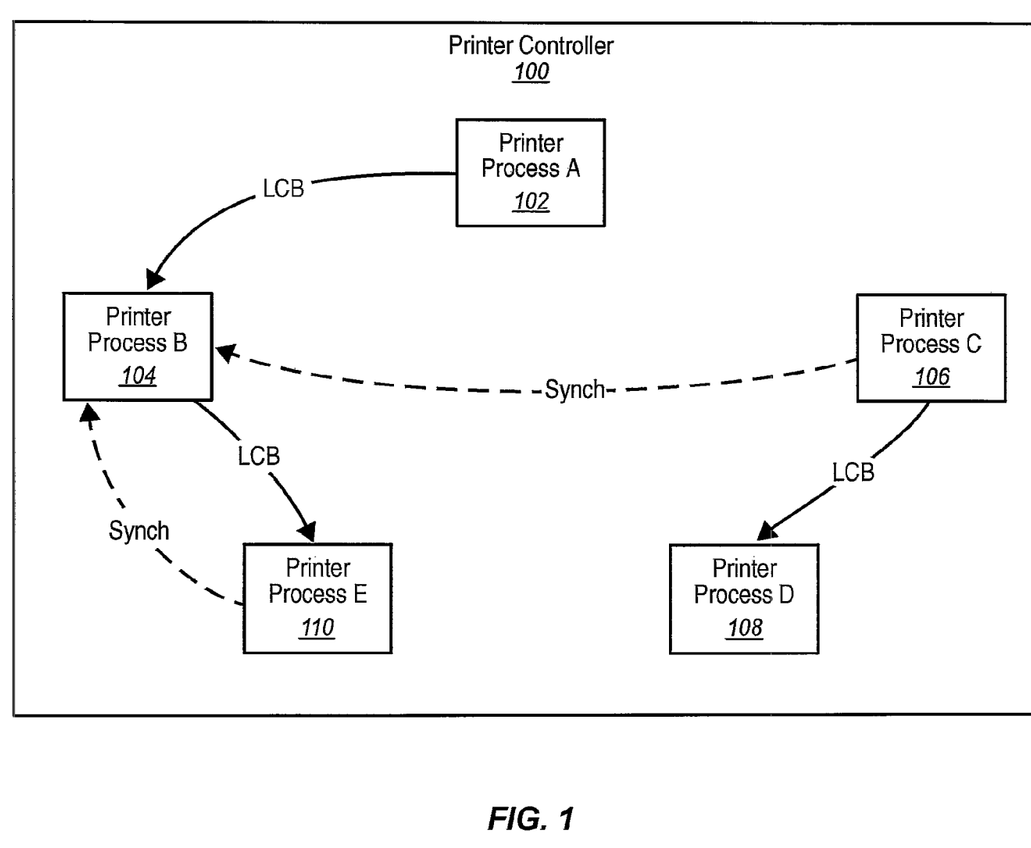
FIG. 1 is a block diagram of cooperating processes operable in a printer controller in accordance with features and aspects hereof to provide synchronization and control of the multiple processes using headers exchanged in same data paths used for exchange of print data.

FIG. 1 is a block diagram of an exemplary printer controller 100 in which a plurality of processes are operable to cooperatively process received print data and render corresponding pages on the printable media. FIG. 1 is block diagram providing a general view in which five processes (102 through 110) exchange synchronization and control information utilizing logical control block structures ("LCB"). An LCB includes synchronization and control information associated with the printer process that generates the LCB. Such an LCB may also include print data processed in some manner by the process that generates the LCB for forwarding to a next process in the printer controller. An LCB (with or without associated printed data) is then forwarded to the next process for further processing within the printer controller 100.

For example, printer process A 102 generates synchronization and control information with or without associated print data as an LCB forwarded to printer process B 104. The synchronization and control information so generated by printer process A 102 may or may not indicate that printer process B 104 should signal detection of some particular event in its further processing of the received LCB. Printer process B 104 may, in turn, process the received LCB (including any associated print data) and generate a next LCB (with or without associated print data) for forwarding to printer process E 110. Printer process E. 110 processes the received LCB. The received LCB may indicate that printer process B 104 needs to be notified of detection of a particular event or events as indicated within the LCB. If and when printer process E 110 detects such an indicated event or condition, a synchronization signal may be returned to printer process B 104 as indicated by the dashed arrow connecting the two processes. In like manner, independent printer process C 106 may determine that synchronization is required with some aspect of printer process B 104. For example, printer process C 106 may be associated with input from a print operator or administrative user indicating that some particular processing needs to be synchronized with some other event. In such a case, printer process C 106 may generate a synchronization signal returned to printer processed B 104 and may also generate an LCB including still further synchronization and control information and may forward the generated LCB to printer process D 108.

FIG. 1 is intended merely as general depiction of the high level structure of a printer controller 100 in accordance with features and aspects hereof. Generally shown by FIG. 1 is a printer controller in which a plurality of processes are operable and in which the various processes synchronize and control their concurrent operation by the exchange of synchronization and control information formatted as LCBs and synchronization signals exchanged among the various processes. As noted, print data forwarded among the various printer processes is also associated with a generated LCB indicating any required synchronization or control to be associated with processing of that print data. Thus, the synchronization and control information formatted as LCBs are exchanged utilizing the same communication data paths between processes used for exchange of print data. Thus synchronization and control of printer processes 102 through 110 is simplified in that it is coordinated with, and an aspect of, the normal communication of print data among the various printer controller processes.

Those of ordinary skill in the art will readily recognize that any number of such printer processes may be designed within a particular printer controller in accordance with a desired architecture and the printing features supported by such a printing system. FIG. 1 is thus intended merely as a high level representation of a printer controller 100 configured, adapted, and operable in accordance with features and aspects hereof.

Figure 2:
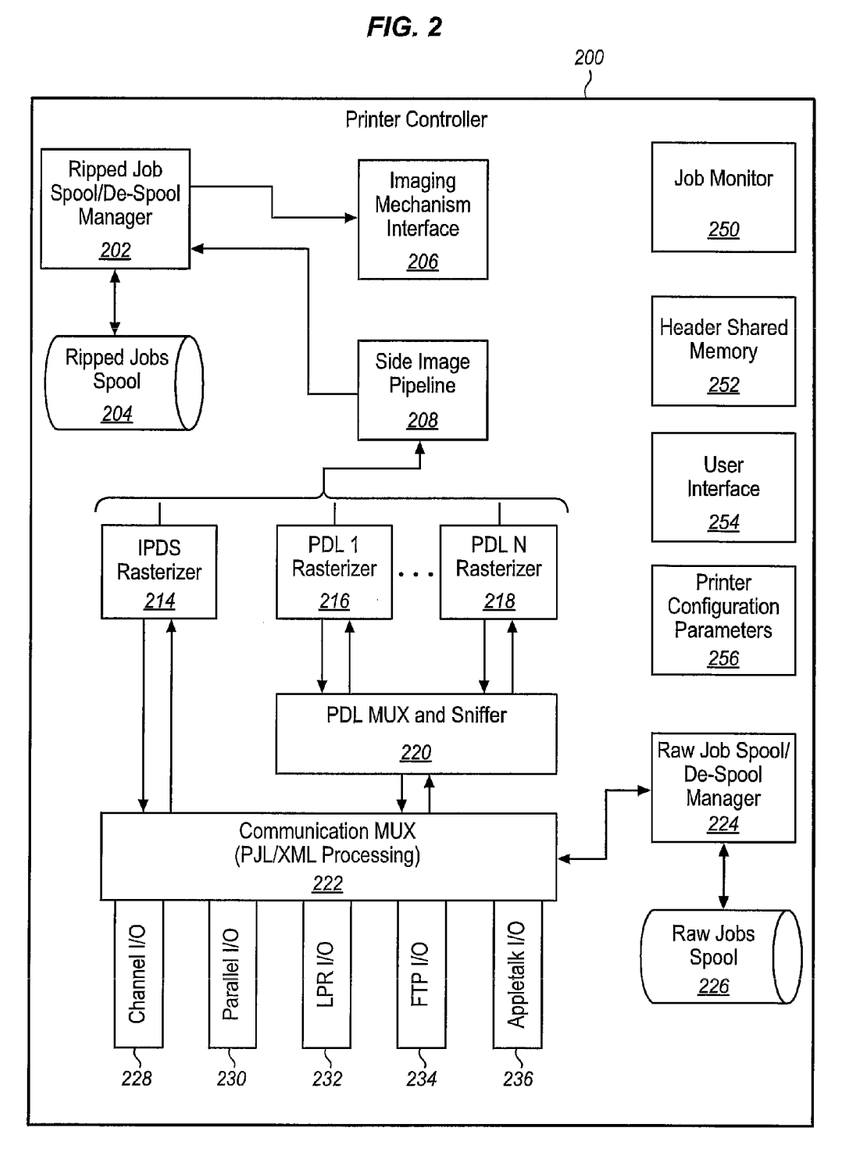
FIG. 2 is a block diagram providing exemplary additional details of typical processes and structures within an exemplary printer controller to provide synchronization and control of the processes in accordance with features and aspects hereof.

FIG. 2 is a block diagram of an exemplary printer controller 200 that exchanges synchronization and control information through the same data paths as print data in the printing system. Depicted in FIG. 2 are numerous functional elements of an exemplary print controller 200 with arrows generally indicating data flow paths in which printed data and/or synchronization and control information may flow. In general, print data generated by an attached host system (not shown) is received by an I/O interface process 228 through 236. Exemplary of such I/O interface processes are modules adapted for IBM channel I/O 228, printer parallel I/O 230, TCP/IP LPR protocol I/O 232, TCP/IP FTP protocol 234, and AppleTalk I/O 236. Those of ordinary skill in the art will readily recognize a wide variety of additional interface modules and associated protocols for transmitting print data from an attached host system to printer controller 200 (and for return of status information from the printer controller 200).

A communication multiplexer (MUX) 222 receives print data from the various I/O interface processes and logically couples a currently active I/O interface process to an appropriate process for further processing of received print data. In some cases, raw print data may simply be spooled and later retrieved (de-spooled) by raw job spool manager 224. Received raw print jobs may be stored and managed by raw job spool manager 224 on raw job spool 226.

Communication MUX 222 and raw job spool manager 224 represent an example of cooperating processes between which synchronization and control information may be exchanged. For example, print data received by an associated I/O interface module may pass from communication MUX process 222 to raw job spool manager 224 with appropriate synchronization and control header information useful to coordinate the beginning and end events associated with a print document, a print job, or a particular sequence of print data encoded in a particular page description language ("PDL").

A print job received by communication MUX 222 from an appropriate I/O interface 228 through 236 or from the raw job spool manager 224 may then be forwarded to PDL MUX and sniffer 220 or may be forwarded to IPDS rasterizer 214 as appropriate for the particular print job. Data so transferred between communication MUX 222 and either sniffer 220 or IPDS rasterizer 214 may be transferred with LCB headers for synchronization and control information. The LCB headers so transferred may include synchronization and control information to permit synchronization of processing between the communication MUX 222 and either the PDL MUX and sniffer 220 or the IPDS rasterizer 214. For example, such synchronization may include identifying the beginning or end of the document, of a print job, or of a boundary of print data at which a change in the page description language may be allowed. Optional features within communication MUX 222 may assist in parsing received data to identify such boundary conditions of received print data. For example, received print data may include PJL or XML job related commands for indicating such boundaries in the received print data.

PDL MUX and sniffer 220 may receive LCBs with or without print data from communication MUX 222 and is operable to forward received data to an appropriate page description language process. In particular, PDL 1 rasterizer 216 through PDL N rasterizer 218 are each adapted for processing corresponding page description language. For example, a first rasterizer may process the PCL page description language data while a second rasterizer may process Postscript page description language print data. Those of ordinary skill in the art will readily recognize numerous other page description languages and data encodings for received print data. Each rasterizer 216 through 218 is therefore responsible for transforming or translating received print data into corresponding rendered page images.

As above, data exchange between PDL MUX and sniffer 220 and each of the plurality of rasterizer processes 216 through 218 includes an associated LCB header to incorporate synchronization and control information for any required synchronization between the various processes.

An LCB header may be "associated" with any data in that it may be actually appended (or pre-pended) to contiguous memory of the associated data or may be logically linked with associated data. Such logical linkages may utilize pointers or other well known data structures and programming techniques to associate a header and any related data. Those of ordinary skill in the art will readily recognize a wide variety of suitable programming structures and methods for associating the header information with any print job data.

Rasterizers 214 through 218 generate page images (page side images) for each rendered page generated by the corresponding rasterizer process. Such rendered, rasterized page images are forwarded to a side image pipeline process 208 for further processing. Side image pipeline process 208 receives one or more side images each corresponding to an associated print job or document. The received side images are then forwarded to ripped job spool/de-spool manager process 202 for a temporary storage on the ripped job spool 204. Eventually, all ripped jobs are forwarded from the ripped job spool manager to the imaging mechanism interface 206 for presentation on the printable media.

Processing within the side image pipeline process 208 and the ripped job manager 202 may include reformatting of the side images into appropriate positions on one or both sides of the printable media (e.g., one or more side images may be applied to each of one or both sides of the printable media).

Various synchronization requirements may arise between the processing of side image pipeline process 208, ripped job spool manager 202, and imaging mechanism interface 206. Data exchanged between these various processes therefore includes associated LCB headers identifying relevant synchronization and control information useful to coordinate processing of these various processes.

Various reverse direction or back-channel communication paths are also shown in the exemplary printer controller 200 of FIG. 2. For example, rasterizers 214 through 218 may generate data to be returned to an attached host system. Such reverse direction or back-channel data may be forwarded from, for example, the IPDS rasterizer 214 through communication MUX 222 to the appropriate communication I/O interface 228 through 236. Those of ordinary skill in the art will readily recognize that some but not all communication I/O interfaces may provide support for such back-channel communications. As for the forward direction of communication for print data, reverse direction or back-channel communication data is also associated with appropriate LCB headers to permit synchronization and control of the various processes associated with the generation and transmission of such back-channel data. For example, back-channel information may be generated in response to commencement or completion of a particular document, page processing, or page description language encoding.

As described thus far, FIG. 2 a variety of typical processes within an exemplary printer controller 200 enhanced in accordance with features and aspects hereof. The various data paths as including back-channel data paths as indicated by the darkened arrows of FIG. 2 principally represent the transmission of print data with an associated LCB header providing synchronization and control information associated with processing of the received print data or represent generated back-channel data with associated LCB headers associated for synchronization and control. In addition, LCB headers devoid of any print data or back-channel data may be forwarded along the same data paths as already described. An LCB header may be provided to a process devoid of any associated print data or back-channel data to permit synchronization and control between various processes in response to asynchronous events not associated with any particular received print data. For example, job monitor process 250 may include a variety of elements that may generate such asynchronous information useful in further synchronization and control of the various processes described above. User interface 254 may provide synchronization and control information based upon print operator or administrative user input. A print operator may direct that a previously spooled raw print job (e.g., a job spooled on spool 226) or a previously rendered/ripped print job (e.g., a job spooled on spool 204) may be released for further processing within the printer controller 200. Such a request received by user interface 254 may generate an appropriate LCB header providing corresponding synchronization or control information and it may be injected into the data streams described above (e.g., added to the input queue of one or more processes) for exchange among the various printer processes already discussed.

Still further, user interface 254 or host defined control information may alter configuration parameters of the printing system. Printer configuration parameters 256 therefore represents storage of current settings of print parameters for operation of printer controller 200. Any change to such parameters may represent an event that causes generation of an LCB header including synchronization and control information (but devoid of print data) indicating such a change has occurred. Various processes may then receive and/or exchange the LCB and appropriately control their subsequent operation in accordance with the changed printer configuration parameters 256.

The various LCB headers exchanged among the exemplary printer processes of FIG. 2 as well as the associated data (if any) may preferably be stored in a shared memory 252. Such a shared memory may utilize well known multi-port control architectures and/or may include appropriate arbitration logic features to coordinate access to the shared memory 252 by the multiple processes operable within printer controller 200.

Those of ordinary skill in the art will readily recognized numerous additional functional elements that may be present in a fully operational printer controller 200. Such additional well known elements are eliminated in FIG. 2 for simplicity and brevity of this discussion. Still further, some of the depicted functional elements within the exemplary printer controller 200 of FIG. 2 may be eliminated in certain applications or may be integrated with other processes. Still further, for simplicity and brevity of this description other communication paths among the various elements of FIG. 2 are omitted. For example, those of ordinary skill in the art will readily recognize ubiquitous interprocess communication features whereby elements such as 250 through 256 may interact with other elements of the controller 200. Therefore, FIG. 2 is merely intended as exemplary of one possible embodiment of features and aspects hereof in which a printer controller is adapted to exchange synchronization and control information as LCB headers among the various processes operable within the printer controller.

Figure 8:
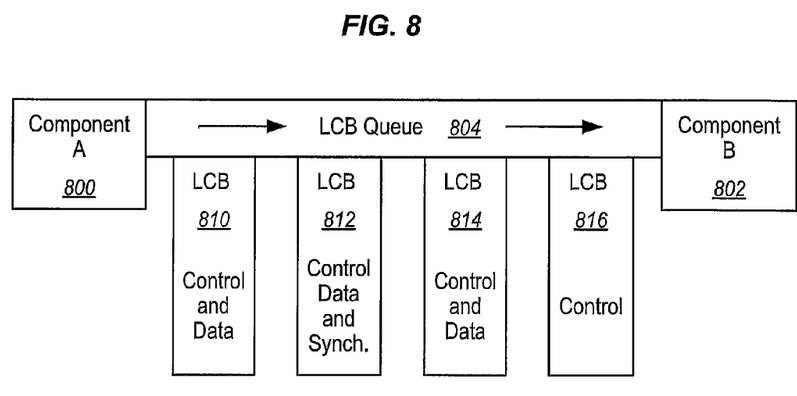
FIG. 8 is a representation of a queue used to couple components in a printing system.

FIG. 8 is a representation of a queue 804 used to couple component A 800 to component B 802 in a printing system. The queue provides a sequence of queued LCBs 810 through 816 generated by component A 800 for consumption (processing) by component B 802. Such a queue provides the general benefit of any queue—namely speed matching where a producer of information does not match the speed of processing of a consumer of information. In accordance with features and benefits hereof, LCB queue 804 also permits synchronization information to be interspersed with data as it is generated and processed by the coupled components 800 and 802. A first LCB 816 generated by component A 800 is ready for processing by component B 802. LCB 816 happens to include a header with only control information relating to cooperative processing of components A and B. A later generated LCB 814 includes both control information header and associated print job data. LCB 812 includes control information in a header, associated print job data, and synchronization information in a header. Lastly, LCB 810 may include both control information in a header and associated print data. This exemplary sequence of queued LCBs demonstrates a benefit of features and aspects hereof in which control and synchronization information is maintained along with print job data in the queue structures coupling cooperative components in the printing system. Where prior techniques and structure isolated control and synchronization information outside the normal data paths thus complicating synchronization of various processes within the printing system, features and aspects hereof integrate the print job data and control and synchronization information to simplify synchronization processing.

Figure 4:
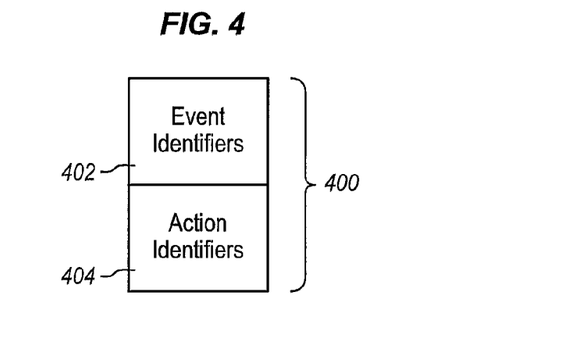
FIG. 4 depicts a typical header structure in accordance with features and aspects hereof wherein events to be detected are identified and corresponding actions to be enacted are identified in the header.

FIG. 4 is a simplified block diagram depicting an exemplary LCB header 400 as may be added to data exchanged within the print controller or as may be exchanged within the print controller devoid of any data. In general, LCB header 400 may include event identifiers 402 representing any suitable indicia of events relevant to a particular process within the system. Events that are relevant to a process that generates the LCB header 400 may be signified by, for example, Boolean indicia, enumerated data types, or other suitable data types indicating particular events of interest to the process that generated the LCB header 400. In addition, LCB header 400 may include action identifiers 404 indicative of corresponding actions to be taken when an indicated event identified by event identifiers 402 is detected by the process receiving the LCB header 400. Typical actions for a detected invent may include, in general, generating a synchronizing signal and applying the synchronizing signal to the process that generated the LCB header. More specifically, exemplary actions may include sending a synchronizing message to an input queue identified in the LCB header associated with the process to receive the signal, stopping or pausing further operation of an identified process operable within the printer controller, resuming processing of a previously stopped or paused process within the printer controller, spawning a new process operable within the printer controller, or killing an existing process operable within the printer controller in response to detection of an identified event. Those of ordinary skill in the art will readily recognize a variety of structures and techniques for encoding event identifiers useful for detecting particular events of interest and for encoding a corresponding action to be performed when an identified event is detected. Further, those of ordinary skill in the art will readily recognize any number of relevant events that may be of significance for synchronization and control of the various processes within an enhanced printer controller and associated actions to be taken upon detection of such events. Exemplary events, as noted above, may include: beginning or end of processing for a job by a process, beginning or end of processing of a document by a process, beginning or end of processing for a particular page description language by a process, and any of numerous other events readily recognized by those of ordinary skill and the art.

Further, those of ordinary skill in the art will readily recognize a variety of data structures that may be employed for storing the header information and for associating the LCB header with any related print data (or back-channel data). In addition, the particular form of the header data structure may vary based on the needs of particular processes operable within the printer controller. For example, events and actions associated with processing of raw print job data may differ from the events and actions typically useful for processing of rendered/ripped print job data. Thus the LCB header structures used for synchronization and control of processes dealing with raw print data may differ from the LCB header structures used for synchronization and control of processes involved in processing of rendered/ripped print data. The following pseudo-code example provides a suggestion of one exemplary embodiment of such an LCB header data structure.

```
typedef enum
{
  LCB_TYPE_UNINITIALIZED = 0,
  LCB_TYPE_JOBDATA,
  LCB_TYPE_MECH_TOKEN,
  LCB_TYPE_RIP_DESPOOL_TOKEN
} lcb_type_t;
typedef enum
{
  LCB_DATATYPE_UNINITIALIZED = 0,
  LCB_DATATYPE_AUTO,
  LCB_DATATYPE_IPDS,
  LCB_DATATYPE_PJL,
  LCB_DATATYPE_PS,
  LCB_DATATYPE_PDF,
  LCB_DATATYPE_ESC_P,
  LCB_DATATYPE_PCL5,
  LCB_DATATYPE_PCL6,
  LCB_DATATYPE_ESCS,
  LCB_DATATYPE_PAGES,
  LCB_DATATYPE_NUM_DATATYPES
} lcb_datatype_t;
typedef enum
{
  LCB_DEST_UNINITIALIZED      = 0x0000,
  LCB_DEST_PMDD               = 0x0001,
  LCB_DEST_IPDS               = 0x0002,
  LCB_DEST_TO_RIP_SPOOL       = 0x0004,
  LCB_DEST_RAW_SPOOL          = 0x0008,
  LCB_DEST_MCU                = 0x0010,
  LCB_DEST_BIT_BUCKET         = 0x0020,
} lcb_dest_t;
typedef struct lcbHeader {
    lcb_type_t   lcbType;    /* 1-Job Data, 2-Mech Token, 3 Rip Despool Token
                                as noted, LCB structures may vary
                                depending on processes using the LCB.
                                This field identifies a type of this LCB
                                structure */
    int32_t      jobId;      /* The job id from job monitor. */
    int32_t      docId;      /* The document id from job monitor */
    int32_t      msgQId;     /* Msg queue to which event related msgs are
                                sent for forward and backchannel traffic */
    Boolean      startJob;   /* This LCB is the first of a new job. */
    Boolean      endJob;     /* This LCB is the last of a job. */
    Boolean      startDoc;   /* This LCB is the first of a new document. */
    Boolean      endDoc;     /* This LCB is the last of a document */
    Boolean      startPDL;   /* This LCB is the start of a PDL group.*/
    Boolean      endPDL;     /* This LCB is the end of a PDL groupb.*/
    int32_t      notify;     /* Notify when LCB processing complete. */
    Boolean      reset;      /* Reset to defaults before processing LCB. */
    Boolean      asciiJobWaiting;   /* this is to inform IPDS whether an ASCII
                                       job is waiting or not - set on the first
                                       data block only. Default is FALSE. */
    lcb_dest_t   destination;   /* 1 is print, 2 is IPDS , 4 is to RIP spool,
                                   (bitmask, more than one can be on) */
    /* If any print or back-channel data is associated with the LCB, the
       following fields relate to and point to such associated data (if any) */
```

```
lcb_datatype_t    dataType;       /* set by PDL MUX/Sniffer */
int32_t           lcbBlockID;     /* increments for each LCB - set by mux */
int32_t           prevLcbBlockID; /* previous lcbBlockID sent downstream by mux */
int32_t           dataBlkOffset;  /* Offset to first data block descriptor,
                                     Null if none */
} LCBHeader_t;
```

Those of ordinary skill in the art will readily recognize a variety of additional fields in such a data structure that may be useful in particular applications of features and aspects hereof. For example, when an IPDS rasterizer is integrated in a printer controller along with processes for other "ASCII" PDLs, various other forms of synchronization and control may be provided by fields within the LCB header structure. Conversely, when no IPDS interpreter is present in the printer controller processes, some of the exemplary fields noted above are superfluous and may be readily eliminated. Further, the exemplary header structure shown above suggests only support of an action that sends a synchronizing signal as a message to another process queued on an identified input queue (msgQId) of another process. As already noted above, the actions supported when an event is detected may include any number of actions in addition to or in place of sending a message to an identified queue. For example, starting/stopping further processing by an identified process may be an action to be performed in response to detecting an identified event. Or, for example, spawning or killing other processes may be a supported action in response to detecting an identified event. Numerous other types of events and corresponding actions in addition to those exemplified by the above pseudocode or in place thereof will be readily apparent to those of ordinary skill in the art.

Figure 3:
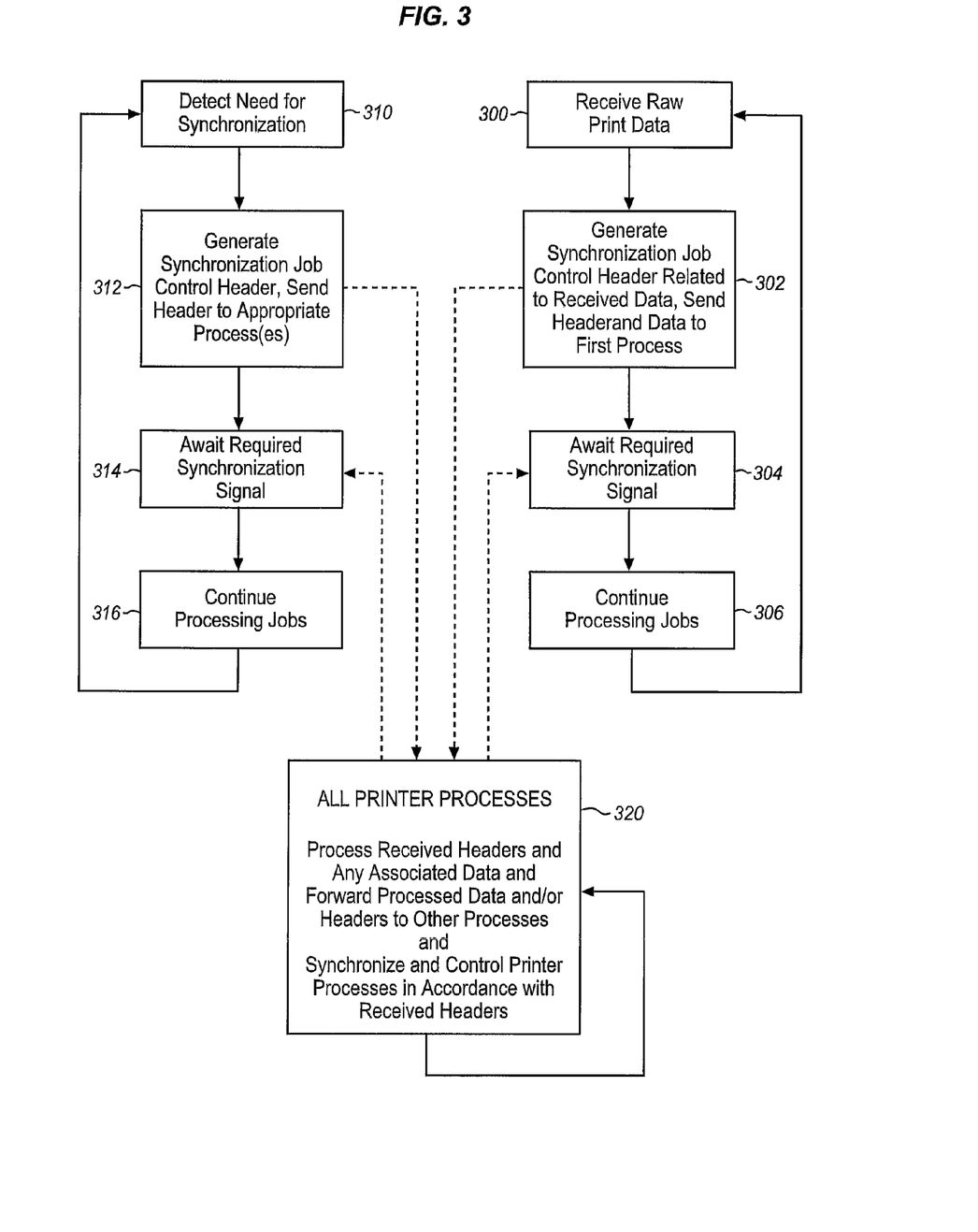
FIG. 3 is a flowchart describing processing among a plurality of printer controller processes to provide synchronization and control of the multiple processes in accordance with features and aspects hereof.

FIG. 3 is a flow chart broadly describing coordinated processing of multiple processes operable within a printer controller enhanced in accordance with features and aspects hereof. Elements 300 through 306 represent processing of any single process within the printer controller that receives print data and requires synchronization with other processes to properly process the received print data. In particular, element 300 represents processing to receive raw print data from an attached host or from a de-spool process within the printer controller. Element 300 may also represent processing initiated by a process in receipt of back-channel data generated within the printer controller.

Realizing that synchronization with other processes may be required, element 302 is operable to generate appropriate synchronization and control information as a job control header (e.g. an LCB). The job control header relates to the received data and the requirement for synchronization with one or more other processes within the printer controller. In particular, as noted above, the LCB may include information identifying particular events of interest to this process and appropriate actions to be performed by another process upon detection of the indicated the event or events. Element 302 then transmits the generated LCB header and the associated data to a first (or next) process within the enhanced printer controller.

Since a need for synchronization was realized by this process, element 304 is next operable to await requisite synchronization as indicated by receipt of a synchronization signal from one or more other processes in the enhanced printer controller. Upon receipt of such a signal, element 306 is next operable to continue processing received print data and print jobs (or other data). The process then continues looping back to element 300 receiving more raw print data from an attached host or other data from other printer processes.

Processing of element of 302 may include the transmission of the generated LCB header to one or more other processes in the enhanced printer controller. As noted above, such transmission may entail transmitting the LCB header with or without associated print or other data to an input queue for the relevant other processes. Further, as noted above, element 304 represents awaiting receipt of a return signal from one or more other processes indicating synchronization to proceed with further processing of the print job. Element 320 therefore represents other processing within all processes of the printer controller to receive and process such an LCB job control header and, if and when appropriate, to generate and return a synchronization signal to the process that generated the LCB header. Further details of the element 320 are discussed further herein below.

Elements 310 through 316 represent processing within an enhanced printer controller that is asynchronous with respect to processing of print data. As noted above, such asynchronous processing may entail interaction with an administrative user or print operator as well as other exchanges with attached host systems that may broadly affect ongoing processing of one or more print jobs. Element 310 is therefore first operable to detect a need for synchronization within a process responsible for such asynchronous event management. Element 312 is then operable to generate an appropriate LCB job control header including synchronization and control information indicating the particular synchronizing events of interest to this process and an appropriate signal to be returned upon detection of such a related event. As above for element of 302, element 312 transmits such a generated header by adding the LCB structure to the input queue of one or more related processes. Element 320 as noted above and as discussed further herein below then represents processing of other processes within the printer controller to detect the indicated event and to return an appropriate synchronization signal to this process.

Element 314 represents processing within this asynchronous event process of the printer controller to await receipt of a return to synchronization signal (e.g., from some other process as represented by element 320 below). Upon receipt of such a synchronizing signal or message, element 316 represents processing to continue processing further print jobs and/or asynchronous events relevant to synchronization and control of the various processes within the enhanced printer controller. Processing therefore loops back to element 310 to await detection of need for still further synchronization relating to other asynchronous events within the printer controller. As noted above, asynchronous events may include, for example, print operator or administrative user interaction to start/stop processing of spooled jobs and/or to change parameters of the printing systems that may affect continued processing of one or more print jobs already received or yet to be received.

Element 320 represents processing of other processes in the printer controller that may receive the LCB job control header information on their respective input queues. The LCB job control headers generated and sent by operation of other processes as indicated by elements 302 and 312 above indicate to this process (represented as element 302) that synchronization or other job control is required by the other process to synchronize or otherwise coordinate with this process. Element 320 therefore represents processing within a process in receipt of an LCB generated as above by element 302 or 312. Any data associated with the received LCB header is processed by element 320. Resulting print data (if any) plus an appropriate newly generated LCB header may then be forwarded to other processes for still further processing of the associated print job and for other synchronization and control functions.

In addition, element 320 performs synchronization and control as defined by the events and actions indicated by the synchronization and control information in the LCB header. If the LCB header indicates that the process generating the LCB requires detection and signaling of a particular event, this process (element 320) performs requisite detection of the indicated event and, if detected, performs the indicated actions (e.g., signaling the process that generated the LCB). As noted above, indicated events may include any number of conditions related to processing of a print job or other control of the printer. For example, indicated events in the LCB may include beginning and/or end of processing for a job, a document, and/or a particular page description language. Indicated actions corresponding to detecting those events may include sending a signal or message to an identified input queue of another process, starting/stopping another process, spawning/killing another process, etc.

Figure 5:
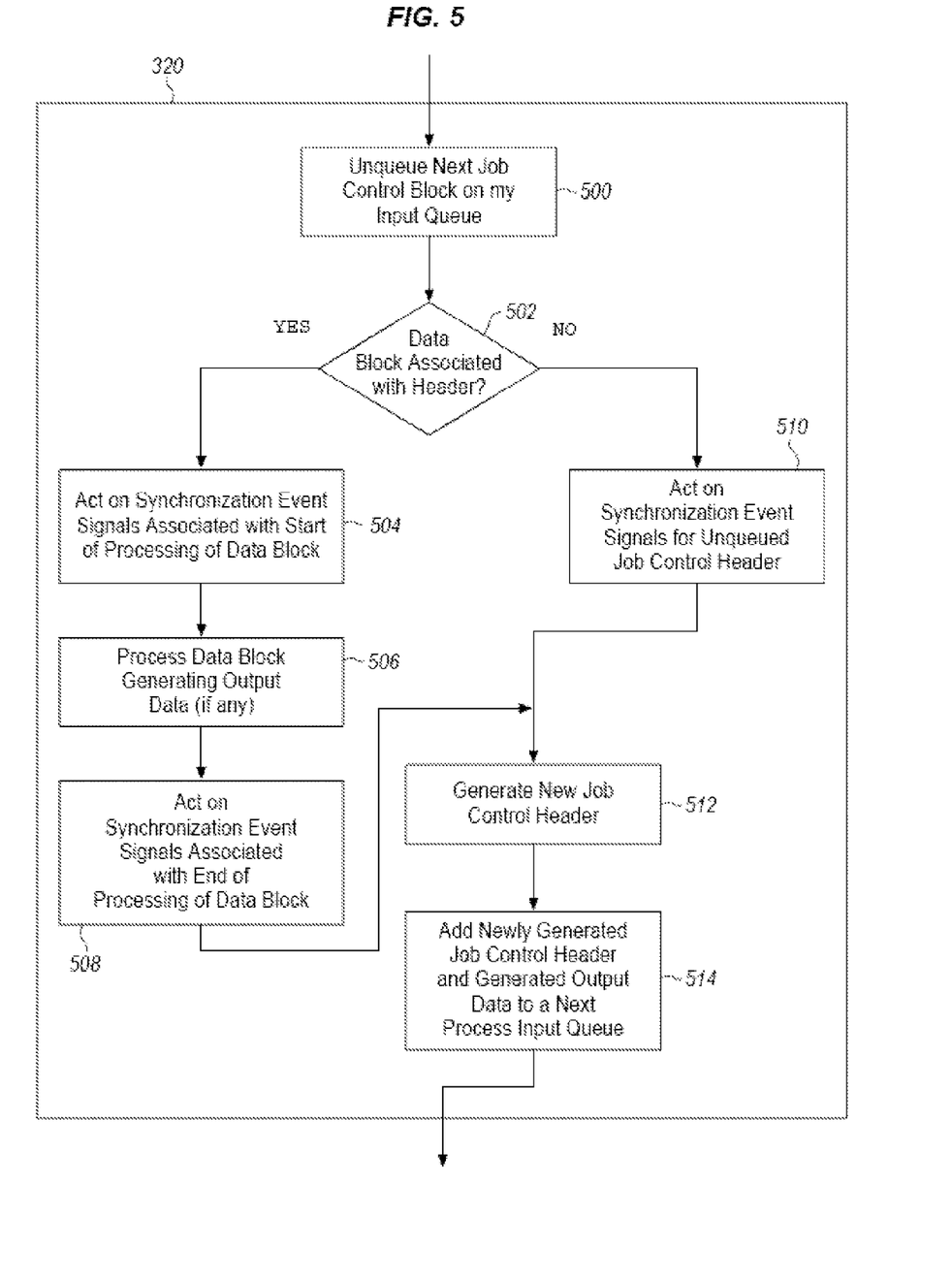
FIG. 5 is a flowchart providing exemplary additional details of processing of aspects of the process of FIG. 3.

FIG. 5 is a flow chart providing additional exemplary details of the processing of element 320. As noted above, element 320 represents processing within all the processes of the enhanced printer controller to receive an LCB header having synchronization and control information therein and to process such synchronization and control information to achieve desired synchronization of various processes if and when necessary within the printer controller. As noted above, each process within the enhanced printer controller may preferably include such synchronization processing responsive to receipt of synchronization and control information header (e.g., an LCB job control header) on its respective input queue. Element 500 represents processing to unqueue a next job control header (LCB) from the input queue of this process.

Element 502 then determines whether any print data (or other data) is associated with the unqueued header. If not, element 510 is next operable to act upon the synchronization and control events and signals indicated in the unqueued job control header. Acting upon such synchronization and control information may entail detecting whether an identified event or events have occurred within the printer controller operation and taking action upon detection of such an event. Element 512 is then operable to forward a new job control header along within the requisite print data to a next process within the printer controller. It may be that this process does not recognize the identified events or is not configured to respond to recognition of such events. Therefore, a new job control header may be generated by this process forwarding along information requested by the earlier process that generated this unqueued LCB. Element 514 then queues the newly generated job control header and any associated output data to a next process input queue for further processing.

If element 502 determines that the unqueued LCB is associated with some print data, element 504 is next operable to act on synchronization events and actions identified in the unqueued LCB header associated with the start of processing of the associated data block. As noted above, some events and associated actions may be related to the commencement of processing of a particular job, page, document, or page description language. Thus, element 504 determines if the beginning of such an event has occurred and acts appropriately on the detected event as indicated by the LCB header information. Element 506 is then operable to process the print data block associated with the unqueued LCB. Processing of such print data varies depending upon the particular function of this process. Exemplary functions within a typical printer controller are discussed above with respect to FIG. 2. Element 508 is then operable to act upon synchronization and control information identified in the unqueued header but associated with the end of processing of some portion of data. As noted above, various events may be associated with the end of processing for a particular job, page, document, or page description language. If such an event is detected and indicated as relevant in the unqueued LCB header, element 508 acts appropriately on that identified and detected event in accordance with the synchronization and control information in the LCB header. Processing then continues with elements of 512 and 514 as noted above to generate and transmit a new LCB to a next process in the printer controller accompanied by any print or other data generated by processing of element 506.

Those of ordinary skill in the art will readily recognized numerous equivalent method steps operable to detect an indicated event and to act upon a detected event to provide desired synchronization and control of multiple processes within the printer controller. FIG. 5 is therefore merely intended as exemplary of one possible embodiment of features and aspects hereof within an enhanced printer controller.

Figure 6:
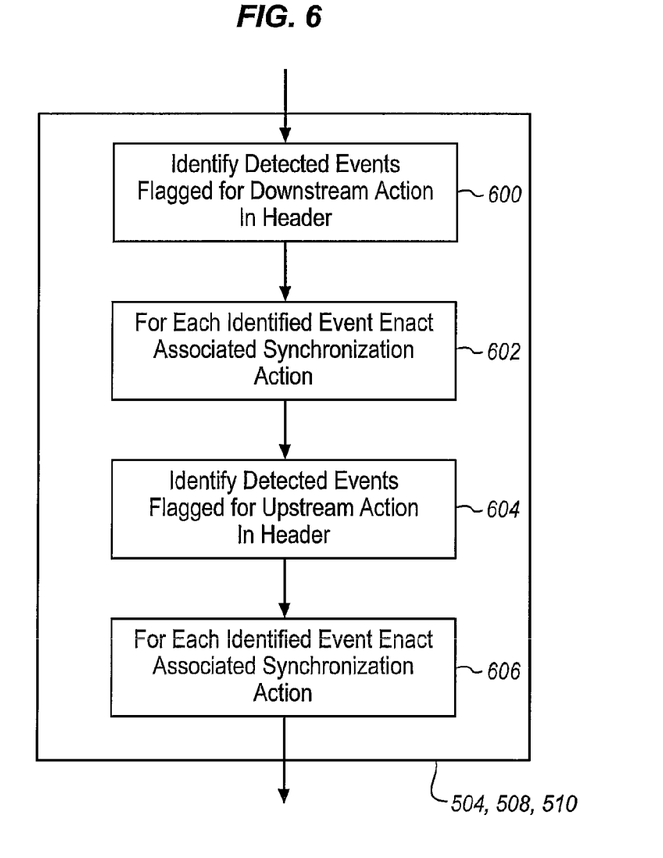
FIG. 6 is a flowchart providing exemplary additional details of processing of aspects of the process of FIG. 5.

FIG. 6 is a flow chart describing exemplary additional details of the processing of elements 508, 504, and 510 noted above with respect to FIG. 5. Element 600 is first operable to identify events related to downstream actions as indicated by the header information. As used herein, "downstream" refers to the movement of received print data further into processing within the printer controller toward eventual rendering and marking on the printable medium. "Upstream" refers to the converse, the direction from which data was received backing all the way up to the source of the data—e.g., a host system application or an asynchronous event LCB header associated with a job monitor of the printer controller.

Element 602 is then operable to act on each identified event detected by operation of the element 600 and to enact the associated synchronization action indicated in the synchronization and control information of the present LCB header. Any such identified, detected, events cause an appropriate synchronization action or actions to be performed with respect to processes downstream from the presently operating process. In like manner, elements 604 and 606 are operable to identify and detect any events indicated in the synchronization and control information header as related to upstream actions. Any such identified, detected, events cause an appropriate synchronization action or actions to be performed with respect to processes upstream from the presently operating process.

Details of actual events and corresponding actions to be performed to effectuate the desired synchronization and control of multiple processes within the printer controller are unique to each particular printer controller application. Exemplary events and corresponding actions are presented herein as typical events and actions but are not intended to limit the scope hereof. Thus, FIG. 6 is intended to broadly describe any and all such events and associated actions useful in a particular printer controller application. Those of ordinary skill in the art will readily recognized any number of such exemplary events and appropriate actions to be enacted upon detection of such events.

Figure 7:
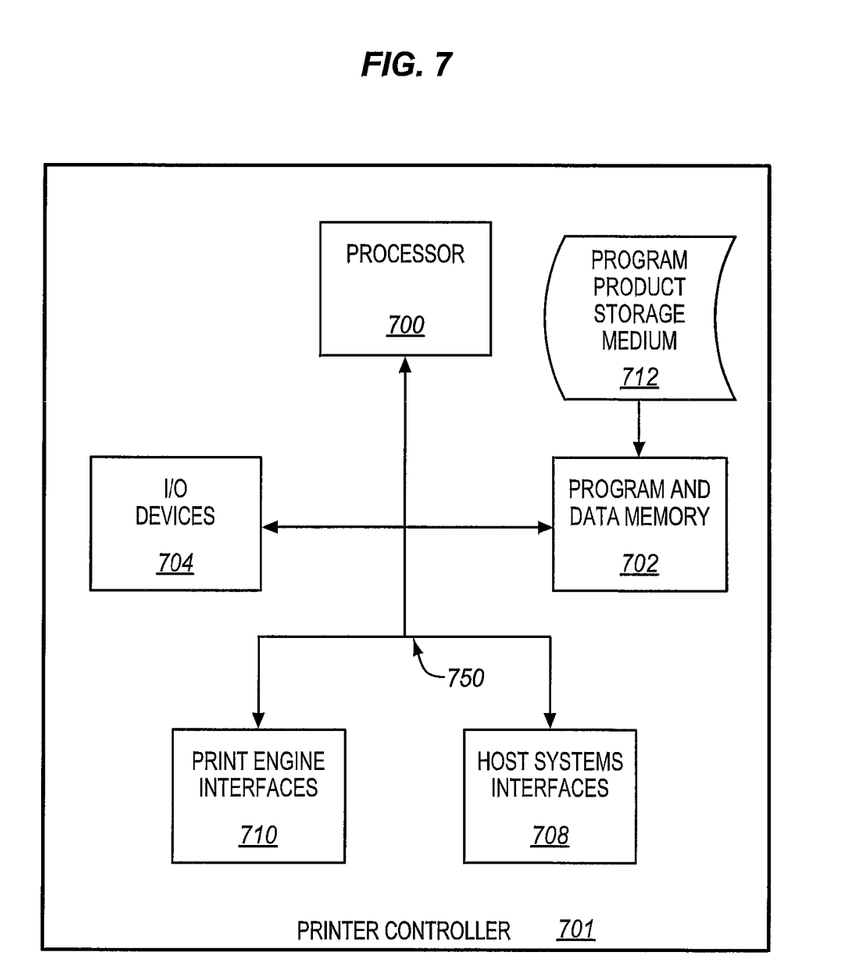
FIG. 7 is a block diagram of a printer controller in accordance with features and aspects hereof that utilizes computer readable medium to store processes implemented in accordance with features and aspects hereof.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 7 is a block diagram depicting a decoder system 750 as including a data processing device (CPU 700 and Memory 702) adapted to provide features and aspects hereof by executing programmed instructions and accessing data stored on a computer readable storage media 712.

Furthermore, the invention can take the form of a computer program product accessible from a computer-usable or computer-readable media 712 providing program code for use by or in connection with a computer or any instruction execution system. For the purposes of this description, a computer-usable or computer readable media can be any apparatus that can contain, store, communicate, propagate, or transport the program for use by or in connection with the instruction execution system, apparatus, or device.

The media can be an electronic, magnetic, optical, electromagnetic, infrared, or semiconductor system (or apparatus or device) or a propagation media. Examples of a computer-readable media include a semiconductor or solid state memory, magnetic tape, a removable computer diskette, a random access memory (RAM), a readily memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 700 coupled directly or indirectly to memory elements 702 through a system bus 780. The memory elements can include local memory employed during actual execution of the program code, bulk storage, and cache memories which provide temporary storage of at least some program code in order to reduce the number of times code must be retrieved from bulk storage during execution.

Input/output or I/O devices 704 (including but not limited to keyboards, displays, pointing devices, etc.) can be coupled to the system either directly or through intervening I/O controllers. One particular I/O device useful in a data processing system adapted as a printer controller is a print engine interface 706 for coupling the decoder system 750 to the signals and protocols of the print engines adapted for marking pixels on paper.

Network adapters or other host system interfaces 708 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A method for job control and synchronization among a plurality of processes operable in a printer controller, the method comprising:
creating, in a first process of the plurality of processes operating within the print controller, a first job control header including synchronization information associated with a portion of print data;
transmitting the first job control header and the associated portion of the print data from the first process to a second process of the plurality of processes operating within the print controller;
creating in the second process, a second job control header including synchronization information associated with the portion of print data;
transmitting the second job control header devoid of print data from the second process to the first process; and
synchronizing processing of the portion of the print data between the first process and the second process based on detection and signaling of an event indicated in the synchronization information of the first job control header.

2. The method of claim 1 wherein the step of synchronizing further comprises:
detecting, in the second process, occurrence of an event indicated in the synchronization information as related to the first process; and
applying a signal from the second process to the first process indicating occurrence of the detected event.

3. The method of claim 1 further comprising:
creating, in the first process, a first job control header devoid of print data and including synchronization information related to the first process, and transmitting the first job control header devoid of print data from the first process to the second process, wherein the step of synchronizing further comprises: receiving, in the second process, the first job control header devoid of print data; and synchronizing operation of the first process and the second process in accordance with the synchronization information.

4. The method of claim 3 wherein the step of synchronizing further comprises:
detecting, in the second process, occurrence of an event indicated in the synchronization information as related to the first process; and applying a signal from the second process to the first process indicating occurrence of the detected event.

5. The method of claim 1 wherein the step of synchronizing further comprises:
detecting in the first process an occurrence of the event; and signaling the second process the occurrence of the event.

6. The method of claim 5 wherein the event comprises at least one event selected from the group consisting of:
beginning of processing of print data for a print job; end of processing of print data for a print job; beginning of processing of print data for a document; end of processing of print data for a document; beginning of processing of print data for a page description language; and end of processing of print data for a page description language.

7. A method operable in a printer controller, the method comprising:
receiving print data within a first process of a plurality of processes operating within the print controller;
generating in the first process a first job control header including synchronization and control information associated with the received print data;
forwarding the print data with the first job control header from the first process to a second process of the plurality of processes operating within the print controller;
generating in the second process, a second job control header including synchronization information associated with the portion of print data;

forwarding the second job control header devoid of print data from the second process to the first process; and
synchronizing processing of the portion of the print data between the first process and the second process based on detection and signaling of an event indicated in the synchronization information of the first job control header.

8. The method of claim 7 wherein the step of synchronizing further comprises:
detecting, in the second process, an event indicated in the first job control header as related to operation of the first process; and signaling occurrence of the detected event to the first process.

9. The method of clam 8 wherein the step of detecting further comprises:
detecting an event comprising at least one event selected from the group consisting of:
beginning of processing of print data for a print job;
end of processing of print data for a print job;
beginning of processing of print data for a document;
end of processing of print data for a document;
beginning of processing of print data for a page description language; and
end of processing of print data for a page description language.

10. The method of claim 8 wherein the step of detecting further comprises:
detecting an event comprising a request to release a previously spooled print job, and
wherein the step of signaling further comprises:
providing the previously spooled print job to the first process.

11. The method of claim 7 wherein the step of synchronization further comprises:
returning a signal from the second process to the first process indicating detection of an event indicated in the synchronization and control information as related to the first process.

12. A computer program product operable in a printer controller comprising a non-transitory computer readable medium embodying a computer readable program, wherein the computer readable program when executed on a printer controller causes the printer controller to perform the steps of:
receiving print data within a first process of a plurality of processes operating within the print controller;
generating in the first process a first job control header including synchronization and control information associated with the received print data;
forwarding the print data with the first job control header from the first process to a second process of the plurality of processes operating within the print controller;
generating in the second process, a second job control header including synchronization information associated with the portion of print data;
forwarding the second job control header devoid of print data from the second process to the first process; and
synchronizing processing of the portion of the print data between the first process and the second process based on detection and signaling of an event indicated in the synchronization information of the first job control header.

13. The computer program product of claim 12 wherein the step of synchronizing further comprises:
detecting, in the second process, an event indicated in the first job control header as related to operation of the first process; and signaling occurrence of the detected event to the first process.

14. The computer program product of clam 13 wherein the step of detecting further comprises:
detecting an event comprising at least one event selected from the group consisting of:
beginning of processing of print data for a print job;
end of processing of print data for a print job;
beginning of processing of print data for a document;
end of processing of print data for a document;
beginning of processing of print data for a page description language; and
end of processing of print data for a page description language.

15. The computer program product of claim 13 wherein the step of detecting further comprises:
detecting an event comprising a request to release a previously spooled print job, and wherein the step of signaling further comprises: providing the previously spooled print job to the first process.

16. The computer program product of claim 12 wherein the step of synchronization further comprises:
returning a signal from the second process to the first process indicating detection of an event indicated in the synchronization and control information as related to the first process.

* * * * *